United States Patent
Li et al.

(10) Patent No.: US 9,631,970 B2
(45) Date of Patent: Apr. 25, 2017

(54) HIGH PRECISION BELT WEIGHING DEVICE AND METHOD

(71) Applicant: SAIMO ELECTRIC COMPANY LIMITED, Xuzhou (CN)

(72) Inventors: Da Li, Xuzhou (CN); Zhiliang Liu, Xuzhou (CN); Fusheng He, Xuzhou (CN); Xingguo Zhang, Xuzhou (CN); Zhen Hu, Xuzhou (CN); Deqiang Zhang, Xuzhou (CN)

(73) Assignee: SAIMO ELECTRIC COMPANY LIMITED, Xuzhou (CN)

( * ) Notice: Subject to any disclaimer, the term of this patent is extended or adjusted under 35 U.S.C. 154(b) by 858 days.

(21) Appl. No.: 13/865,183

(22) Filed: Apr. 17, 2013

(65) Prior Publication Data

US 2013/0219985 A1   Aug. 29, 2013

Related U.S. Application Data

(63) Continuation of application No. PCT/CN2010/080551, filed on Dec. 30, 2010.

(30) Foreign Application Priority Data

Nov. 18, 2010   (CN) .......................... 2010 1 0548484

(51) Int. Cl.
   *G01G 11/00*   (2006.01)
   *G01G 23/01*   (2006.01)
(52) U.S. Cl.
   CPC ........... *G01G 23/01* (2013.01); *G01G 11/003* (2013.01); *G01G 11/006* (2013.01)

(58) Field of Classification Search
   CPC ........................... G01G 11/003; G01G 11/006
   See application file for complete search history.

(56) References Cited

U.S. PATENT DOCUMENTS

| 6,437,255 | B1 * | 8/2002 | Ludescher | G01G 11/006 177/119 |
| 2011/0198197 | A1 * | 8/2011 | Blickley | G01G 11/18 198/657 |

FOREIGN PATENT DOCUMENTS

CN   102012253 A   *   4/2011   .......... G01G 11/003

* cited by examiner

*Primary Examiner* — Paul West

(57) ABSTRACT

Various embodiments provide a high precision belt weighing device and a high precision belt weighing method. An exemplary high precision belt weighing device includes a set of buffer carrier rollers provided between a first and second belt weighing scale frames. A volume scale hopper is provided above the set of buffer carrier rollers. A transfer conveyor is provided above the volume scale hopper. The first and second belt weighing scale frames, the volume scale hopper, an initial point detector, and a speedometer are connected with a weighing control instrument by cables. Cumulative weights of bulk materials handled by each of the first and second belt weighing scale frames, the corrected weight of bulk materials in the volume scale hopper, and a zero point in the length of a conveying belt detected by the initial point detector are displayed on the weighing control instrument.

13 Claims, 2 Drawing Sheets

HIGH PRECISION BELT WEIGHING DEVICE AND METHOD

CROSS-REFERENCES TO RELATED APPLICATIONS

This application claims the priority to International Application No. PCT/CN2010/080551, filed on Dec. 30, 2010, which claims priority to Chinese Patent Application No. CN201010548484.5, filed on Nov. 18, 2010, the entire contents of all of which are incorporated herein by reference.

FIELD OF THE DISCLOSURE

The present disclosure relates to a bulk material weighing device and, more particularly, relates to a high precision belt weighing device and a high precision belt weighing device method on a belt conveyor.

BACKGROUND

With rising prices of bulk materials such as coal and iron ore, there is a rising demand on weighing accuracy of belt weighing devices for use on a belt conveyor. Meanwhile, reliability and stability of the weighing accuracy of the belt weighing devices are becoming more important. Weighing sensors and weighing control instruments currently used for belt weighing scales measured by belt conveyor may have high weighing accuracy of up to 0.03% or more. However, a belt weighing scale configured on a belt conveyor has an accuracy of only between 1% and 0.5% and the stability of the accuracy is often unsatisfied. This may be caused by various factors including belt tension variations and vibrations, depending on the amount of materials handled by the belt conveyor. This may also because the calibration cannot be easily and timely performed.

Existing calibration methods of a belt weighing scale include hanging weight calibration, chain code calibration, cycle chain code calibration, electronic calibration, and material calibration. Among them, the material calibration can substantially truly reflect the status of the materials on an operating belt conveyor, which provides a high level of calibration credibility. Other calibration methods are analog calibrations that cannot reflect the status of the belt tension when the materials cover the entire length of a belt conveyor, which have large calibration errors and thus cannot meet requirements in practice. On the other hand, the material calibration requires a material amount of at least about 2% of the conveying capacity of a belt conveyor according to the requirements of the national standards. When the conveying capacity of a belt conveyor is about 5000 tons per hour, the material amount required for performing the material calibration is about 100 tons per hour. As larger capacity conveyors (10,000 tons per hour) appear, the amount of materials required for the material calibration becomes larger, and thus equipment for material weighing becomes larger.

Existing material calibration methods use forms including a hopper weighing scale, a truck weighing scale, and a track weighing scale. Therefore, the cost for calibration equipment is high. Many steps are involved in taking and discharging materials onsite, and it is hard to obtain desired accuracy for the material calibration. In addition, such calibration affects a normal production process and cannot be timely performed. Further, such calibration takes a long time each time the calibration is performed, and the calibration cannot be easily performed.

BRIEF SUMMARY OF THE DISCLOSURE

Technical Problems

An object of the present disclosure is to overcome the shortcomings in existing technologies and to provide a high precision belt weighing device that has a simple structure, enables low cost, and allows on-line calibration.

Solutions

Various embodiments provide a high precision belt weighing device including a first belt weighing scale frame, a second belt weighing scale frame, and a dispenser that are configured on a belt conveyor. A set of buffer carrier rollers is provided between the first belt weighing scale frame and the second belt weighing scale frame. A volume scale hopper is provided above the set of buffer carrier rollers. A transfer conveyor that is connected to the dispenser is provided above the volume scale hopper. A speedometer is provided on the belt conveyor. An initial point detector for belt weight calibration is configured on the belt conveyor in a forward direction of the set of buffer carrier rollers. The first belt weighing scale frame, the second belt weighing scale frame, the volume scale hopper, the initial point detector, and the speedometer are respectively connected to a weighing control instrument by cables. Cumulative weight of materials handled by the first belt weighing scale frame; cumulative weight of materials handled by the second belt weighing scale frame; weight of materials for calibration in the volume scale hopper; and a zero point of a belt within a length of the belt measured by the initial point detector are displayed on the weighing control instrument.

Each of the first belt weighing scale frame and the second belt weighing scale frame includes a single carrier roller weighing scale frame, a double carrier roller weighing scale frame, or a multi carrier roller weighing scale frame. The initial point detector includes a non-contact type or contact type detector. The dispenser is provided at a middle part or a head part of the belt conveyor.

Various embodiments also provide a high precision belt weighing method. In this method, prior to conveying materials on a belt conveyor, an initial point for a belt weighing calibration can be established by a weighing control instrument via an initial point detector. A portion of the materials can be transferred from the belt conveyor to a volume scale hopper such that the portion of the materials is used as standard materials in the volume scale hopper for the belt weighing calibration. The initial point of the belt weighing calibration can then be detected via the initial point detector. The weighing control instrument can output a signal to control the volume scale hopper to discharge the standard materials therefrom. A measured weight of the standard materials discharged from the volume scale hopper can be obtained and compared with a weight of the standard materials displayed on the weighing control instrument to obtain a correction coefficient. A scale coefficient can be corrected by the weighing control instrument using the correction coefficient so that a corrected weight of the standard materials is displayed on the weighing control instrument. The steps of the comparing and the correcting can be repeated until a weighing accuracy is reached.

Industrial Applicability and Advantageous Effects

The present disclosure includes a belt weighing device that integrates a weighing process with a material calibration process. An exemplary belt weighing device includes an initial point detector, two belt weighing scale frames, a volume scale hopper, and a weighing control instrument to achieve on-line automatic collection of a small amount of materials, instead of a large amount of materials, to perform accuracy comparison and calibration of the belt weighing scale to achieve high precision weighing. Before the belt conveyor starts conveying materials, the weighing control instrument uses the initial point detector to establish an initial point for belt weight calibration. Based on the initial point, automatic zero adjustment is performed with respect to belt weight of a length of the conveying belt moved within a period of conveying time of materials having an amount greater than an accommodation standard of the volume scale hopper. This is to ensure the conveying belt weight within the section of this length of the conveying belt is zero when the weighing control instrument calibrates the amount of the conveyed materials. Since small-amount material calibration is used to replace large-amount material calibration, on-line, instant, and convenient calibration of weighing accuracy of the belt weighing scale can be easily achieved. The cost of the calibration equipment is low. The calibration does not affect or interrupt a normal production process. A high weighing accuracy of the belt weighing scale is ensured. The belt weighing scale has a simple structure with a low cost; allows timely and convenient calibration; provides reliable accuracy; saves manpower and resources; and thus has a wide range of practical applicability.

It is to be understood that both the foregoing general description and the following detailed description are exemplary and explanatory only and are not restrictive of the disclosure, as claimed. Other aspects of the present disclosure can be understood by those skilled in the art in light of the description, the claims, and the drawings of the present disclosure.

REFERENCE SIGN LIST

Figure 1:
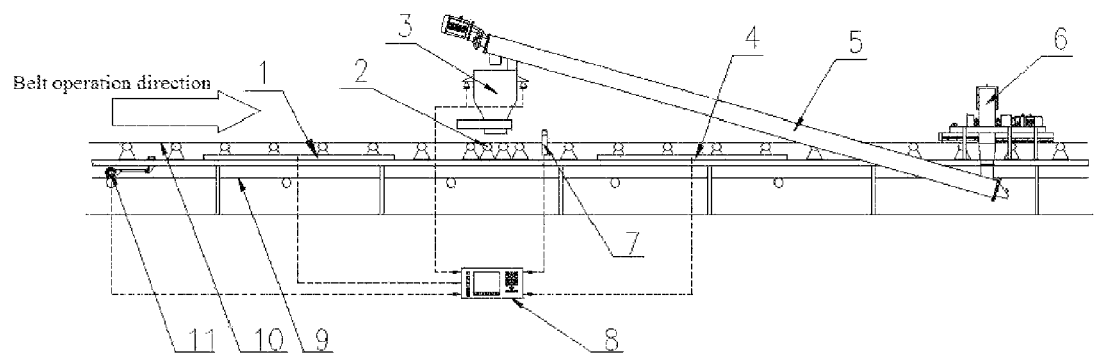
FIG. 1 is a schematic structural diagram of an exemplary belt weighing device in accordance with various disclosed embodiments.

First belt weighing scale frame 1;
Set of buffer carrier rollers 2;
Volume scale hopper 3;
Second belt weighing scale frame 4;
Transfer conveyor 5;
Dispenser 6;
Initial point detector 7;
Weighing control instrument 8;
Lower belt of belt conveyor 9;
Upper belt of belt conveyor 10;
Speedometer 11;
Dispenser shield 12;
Dispenser spoon 13; and
Dispenser support frame 14.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

An exemplary high precision belt weighing device includes a first belt weighing scale frame 1, a set of buffer carrier rollers 2, a volume scale hopper 3, a second belt weighing scale frame 4, a transfer conveyor 5, a dispenser 6, an initial point detector 7, a weighing control instrument 8, and a speedometer 11.

The first belt weighing scale frame 1 and the second belt weighing scale frame 4 may each include a single carrier roller weighing scale frame, a double carrier roller weighing scale frame, and/or a multi carrier roller weighing scale frame. The initial point detector 7 may include a non-contact type detector or a contact type detector. In an example, multi carrier roller type first belt weighing scale frame 1 and second belt weighing scale frame 4 can be configured on the belt conveyor between a lower belt 9 of the belt conveyor and an upper belt 10 of the belt conveyor.

The set of buffer carrier rollers 2 is configured between the first belt weighing scale frame 1 and the second belt weighing scale frame 4. The volume scale hopper 3 is provided above the set of buffer carrier rollers 2. The dispenser 6 can be a scraper type or spiral type that is configured on the belt conveyor at a middle part or a head part in a forward direction of the operation direction of the conveying belt. An outlet of the dispenser 6 is connected to the transfer conveyor 5, which includes a spiral type or belt conveyor type material transfer conveyor provided above the volume scale hopper 3.

The speedometer 11 is configured on the belt conveyor on the outer side of the first belt weighing scale frame 1. The initial point detector 7 is configured on the belt conveyor at a starting position in the forward direction of the set of buffer carrier rollers 2 and transmits belt weight calibration signals to the weighing control instrument 8. The weighing control instrument 8 connects to, e.g., via cables, the first belt weighing scale frame 1, the second belt weighing scale frame 4, the volume scale hopper 3, the initial point detector 7, and the speedometer 11.

The cumulative weight of materials handled (e.g., transited) by the first belt weighing scale frame 1, the cumulative weight of materials handled by the second belt weighing scale frame 2, the weight of materials for calibration in the volume scale hopper 3, and a zero point of the conveying belt within a length of the conveying belt measured by the initial point detector 7 are respectively displayed on the weighing control instrument 8.

In operation, uneven thickness of the conveying belt of the belt conveyor is a main factor that affects when using small-amount (instead of large-amount) material calibration. In various embodiments, the small-amount material calibration may include a material amount of less than about 2%, or less than about 1.5%, or less than about 1.0%, or less than about 0.5% of the conveying capacity of the belt conveyor.

In order to reduce the effect of the uneven thickness of the conveying belt on the accuracy of on-line calibration using the small-amount material, before the belt conveyor starts conveying materials, the weighing control instrument 8 is used to establish an initial point for belt weight calibration via the initial point detector 7. Based on the initial point, automatic zero adjustment is performed with respect to the belt weight of a length of the conveying belt moved within a period of conveying time of materials having an amount greater than an accommodation standard of the volume scale hopper 3 to ensure the belt weight within the section of this length of the conveying belt is zero when the weighing control instrument 8 calibrates the amount of the conveyed materials. Thereby, the accuracy of the small-amount, instead of large-amount, material calibration is ensured.

When the belt conveyor conveys materials, the dispenser 6 that is provided on the belt conveyor automatically takes materials from the belt conveyor and feeds the materials into the transfer conveyor 5 at a pre-set time set by the weighing control instrument 8. The transfer conveyor 5 transfers a portion of the materials to the volume scale hopper 3 for calibration. The weighing control instrument 8 detects an initial point of the belt weighing calibration via the initial point detector 7. The weighing control instrument 8 outputs a signal to control the volume scale hopper 3 to open an outlet to discharge the materials therein.

At this point, the first belt weighing scale frame 1 measures the cumulative weight of handled materials. The second belt weighing scale frame 4 measures the cumulative weight of handled materials and the weight of the standard materials discharged from the volume scale hopper 3. Based on the fact that the amount of materials handled by the first belt weighing scale frame 1 is the same as or similar to the amount of materials handled by the second belt weighing scale frame 4, the weighing control instrument 8 subtracts the cumulative weight measured at the first belt weighing scale frame 1 from the cumulative weight measured at the second belt weighing scale frame 4 to obtain the weight (e.g., a measured weight) of the standard materials discharged from the volume scale hopper 3.

This measured weight of the standard materials is compared with the weight of the standard materials of the volume scale hopper 3 displayed on the weighing control instrument 8 to obtain a correction coefficient. This correction coefficient is used to correct a scale coefficient of the weighing control instrument 8 so that the corrected weight of the standard materials is displayed on the weighing control instrument 8. Such comparison and correction are repeatedly and/or regularly performed so as to achieve high accuracy and high stability of the weighing accuracy of the belt weighing scale.

Meanwhile, materials may cover an entire length of the belt conveyor, and the calibration condition is the same or is close to the condition of a normal conveying operation. In this manner, small-amount material calibration is used to replace large-amount material calibration and is performed on-line with a "normal" belt weighing process, e.g., by performing a conveying operation.

Figure 2:
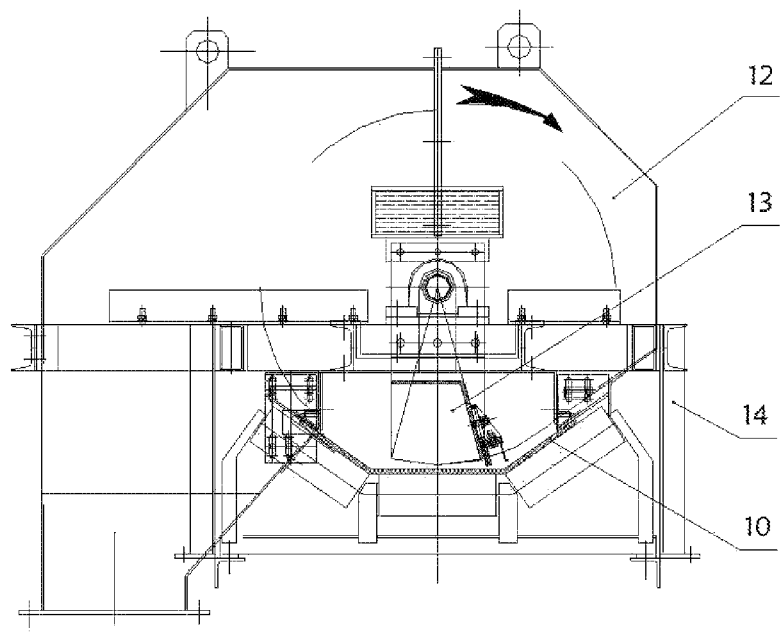
FIG. 2 is a schematic structural diagram of an exemplary dispenser in accordance with various disclosed embodiments.

Referring to FIG. 2, in one embodiment, the dispenser 6 may be provided at the middle part of the belt conveyor and may be a scraper type dispenser. A support frame 14 of the dispenser 6 is fixed on the belt conveyor. A dispenser shield 12 and a dispenser spoon 13 are provided with the dispenser 6. The dispenser spoon 13 scrapes materials from the upper belt 10 of the belt conveyor in a rotational manner. The scraped materials then enter the transfer conveyor 5 along the dispenser shield 12.

Figure 3:
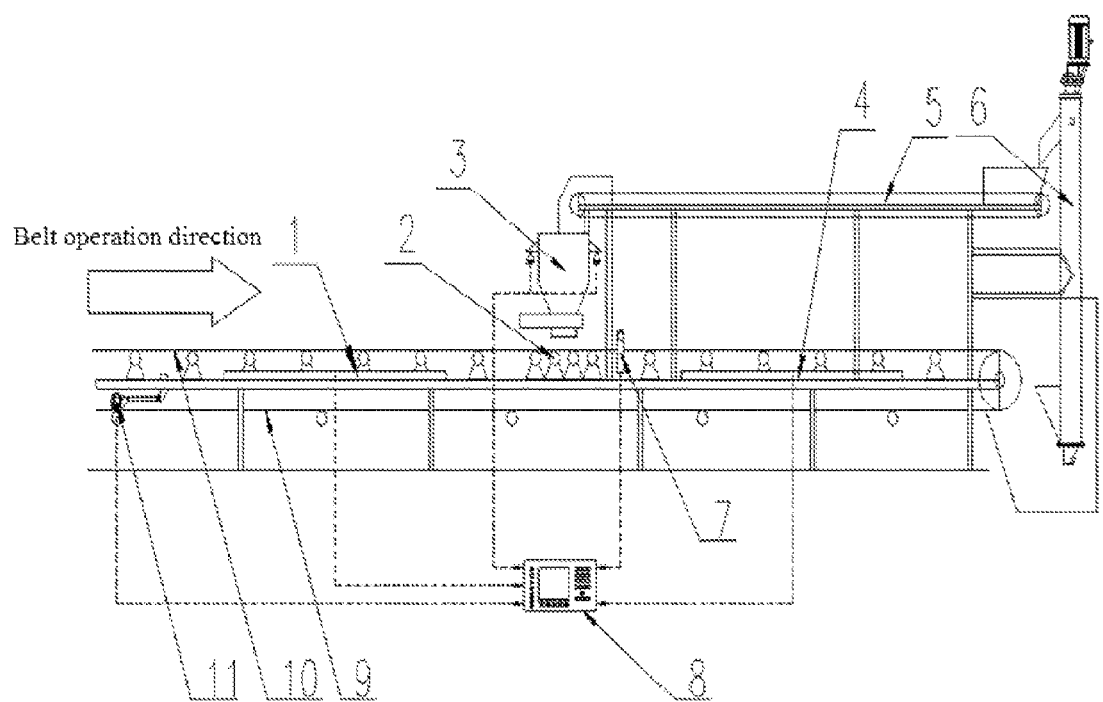
FIG. 3 is a schematic installation diagram of an exemplary head part of a dispenser in accordance with various disclosed embodiments.

In one embodiment, when the dispenser 6 is a scraper type dispenser and configured at the middle part of the belt conveyor, the transfer conveyor 5 may be a spiral type conveyor. In another embodiment, the dispenser 6 is a swingable dispenser and configured at a discharging port at the head part of the belt conveyor. At the time when the dispenser 6 does not take materials, the dispenser 6 may swing away to avoid interfering with the material flow, e.g., a coal flow, handled on the belt conveyor. In this case, the transfer conveyor 5 may use a belt conveyor, as illustrated in FIG. 3.

Other applications, advantages, alternations, modifications, or equivalents to the disclosed embodiments are obvious to those skilled in the art.

What is claimed is:

1. A high precision belt weighing device comprising:
    a first belt weighing scale frame, a second belt weighing scale frame, and a dispenser that are configured on a belt conveyor;
    a set of buffer carrier rollers configured between the first belt weighing scale frame and the second belt weighing scale frame;
    a volume scale hopper configured above the set of buffer carrier rollers;
    a transfer conveyor connected to the dispenser, the dispenser configured above the volume scale hopper;
    a speedometer configured on the belt conveyor; and
    an initial point detector for a belt weight calibration configured on the belt conveyor in a forward direction of the set of buffer carrier rollers, wherein:
    the first belt weighing scale frame, the second belt weighing scale frame, the volume scale hopper, the initial point detector, and the speedometer are respectively connected to a weighing control instrument by cables,
    a cumulative weight of materials handled by the first belt weighing scale frame, a cumulative weight of materials handled by the second belt weighing scale frame, a weight of materials for calibration in the volume scale hopper, and a zero point of a conveying belt within a section of a length of the conveying belt measured by the initial point detector are displayed on the weighing control instrument,
    the dispenser is a scraper type dispenser configured at a middle part of the belt conveyor and,
    the transfer conveyor is a spiral type conveyor.

2. The device according to claim 1, wherein each of the first belt weighing scale frame and the second belt weighing scale frame comprises a single carrier roller weighing scale frame, a double carrier roller weighing scale frame, or a multi carrier roller weighing scale frame.

3. The device according to claim 1, wherein the initial point detector is a non-contact type detector.

4. The device according to claim 1, wherein the dispenser is configured at a middle part or a head part of the belt conveyor in a forward direction of an operation direction of the conveying belt.

5. A high precision belt weighing device, comprising:
    a first belt weighing scale frame, a second belt weighing scale frame, and a dispenser that are configured on a belt conveyor;
    a set of buffer carrier rollers configured between the first belt weighing scale frame and the second belt weighing scale frame;
    a volume scale hopper configured above the set of buffer carrier rollers;
    a transfer conveyor connected to the dispenser, the dispenser configured above the volume scale hopper;
    a speedometer configured on the belt conveyor; and
    an initial point detector for a belt weight calibration configured on the belt conveyor in a forward direction of the set of buffer carrier rollers, wherein:
    the first belt weighing scale frame, the second belt weighing scale frame, the volume scale hopper, the initial point detector, and the speedometer are respectively connected to a weighing control instrument by cables,
    a cumulative weight of materials handled by the first belt weighing scale frame, a cumulative weight of materials handled by the second belt weighing scale frame, a weight of materials for calibration in the volume scale hopper, and a zero point of a conveying belt within a section of a length of the conveying belt measured by the initial point detector are displayed on the weighing control instrument, the dispenser is a swingable dispenser configured at a middle part or a head part of the belt conveyor in a forward direction of an operation direction of the conveying belt, and the transfer conveyor is a belt conveyor.

6. The device according to claim 5, wherein each of the first belt weighing scale frame and the second belt weighing scale frame comprises a single carrier roller weighing scale frame, a double carrier roller weighing scale frame, or a multi carrier roller weighing scale frame.

7. The device according to claim 5, wherein the initial point detector is a contact type detector.

8. A high precision belt weighing method comprising:

establishing, by a weighing control instrument, an initial point for a belt weighing calibration via an initial point detector, prior to conveying materials on a belt conveyor;

transferring a portion of the materials from the belt conveyor to a volume scale hopper such that the portion of the materials is used as standard materials in the volume scale hopper for the belt weighing calibration;

detecting the initial point of the belt weighing calibration via the initial point detector;

outputting a signal by the weighing control instrument to control the volume scale hopper to discharge the standard materials therefrom;

obtaining a measured weight of the standard materials discharged from the volume scale hopper;

comparing the measured weight of the standard materials with a weight of the standard materials displayed on the weighing control instrument to obtain a correction coefficient;

correcting a scale coefficient by the weighing control instrument using the correction coefficient so that a corrected weight of the standard materials is displayed on the weighing control instrument; and repeating the steps of the comparing and the correcting until a weighing accuracy is reached.

9. The method according to claim 8, wherein the establishing of the initial point for the belt weighing calibration comprises:

performing a zero adjustment with respect to a belt weight of a length of the conveying belt moved within a period of conveying time of the materials having an amount greater than the standard materials of the volume scale hopper such that the belt weight within a section of the length of the conveying belt is zero.

10. The method according to claim 8, wherein the transferring of the portion of the materials from the belt conveyor comprises:

feeding the materials, by a dispenser, from the belt conveyor into a transfer conveyor at a pre-set time set by the weighing control instrument, when conveying materials on the belt conveyor; and transferring the portion of the materials from the transfer conveyor to the volume scale hopper as the standard materials.

11. The method according to claim 8, wherein the obtaining of the measured weight of the standard materials comprises:

measuring, at a first belt weighing scale frame, the cumulative weight of materials handled by the first belt weighing scale frame;

measuring, at a second belt weighing scale frame, the cumulative weight of materials handled by the second belt weighing scale frame and a weight of the standard materials discharged from the volume scale hopper, wherein an amount of the cumulative weight of the materials handled by the first belt weighing scale frame is the same as an amount of the cumulative weight of the materials handled by the second belt weighing scale frame; and subtracting, by the weighing control instrument, the cumulative weight measured at the first belt weighing scale frame from the cumulative weight measured at the second belt weighing scale frame to obtain the measured weight.

12. The method according to claim 8, wherein the belt weighing calibration is performed on-line when performing a belt weighing.

13. The method according to claim 8, wherein the materials cover an entire length of the belt conveyor for the belt weighing calibration.

* * * * *